Feb. 29, 1944. J. A. LINKS ET AL 2,342,874
MOTION PICTURE PROJECTING APPARATUS
Filed May 6, 1940 3 Sheets-Sheet 1
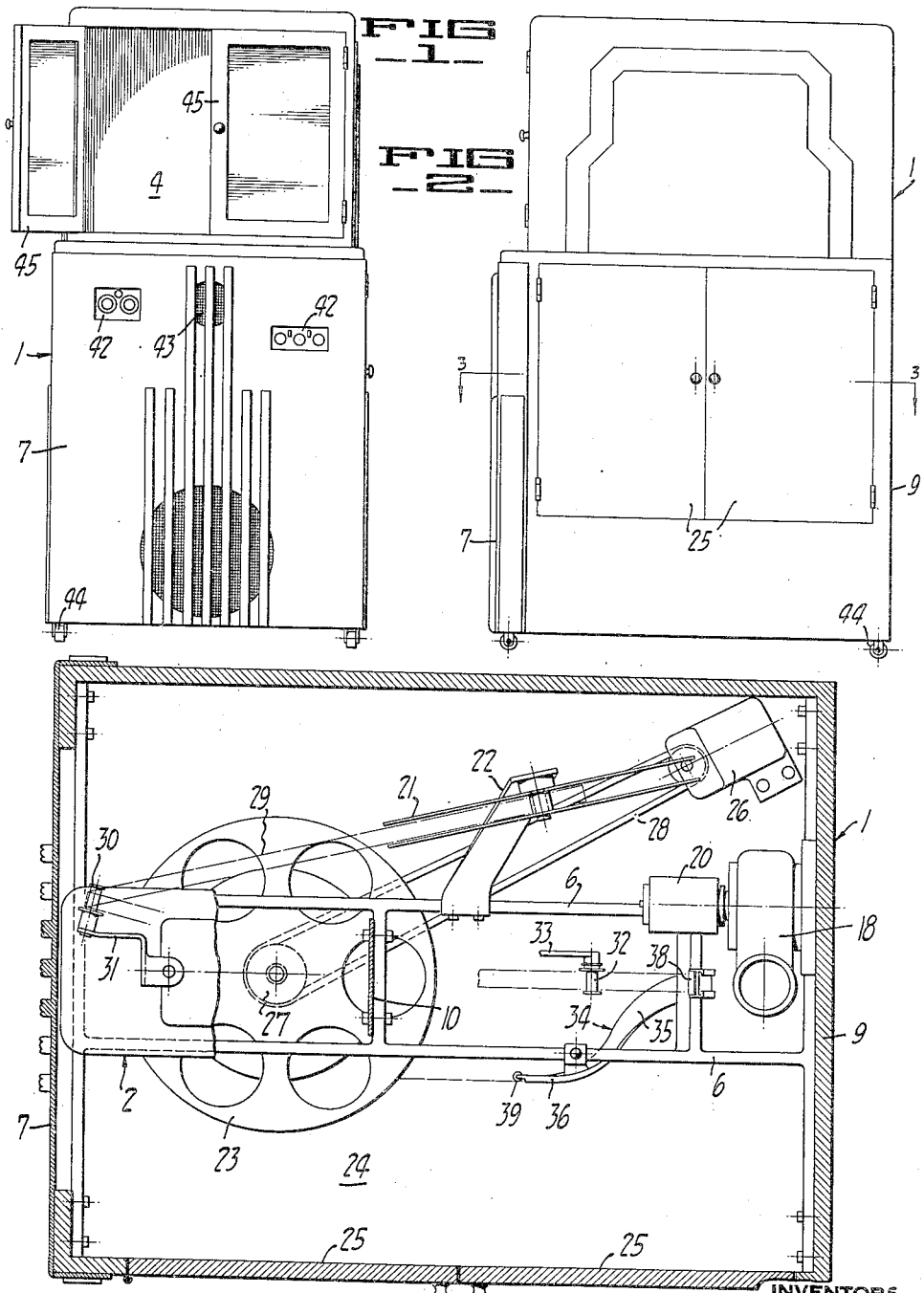
INVENTORS
Julian A. Links
Jerome P. Herst
BY Boykin & Mohler
ATTORNEYS Feb. 29, 1944. J. A. LINKS ET AL 2,342,874
MOTION PICTURE PROJECTING APPARATUS
Filed May 6, 1940 3 Sheets-Sheet 2
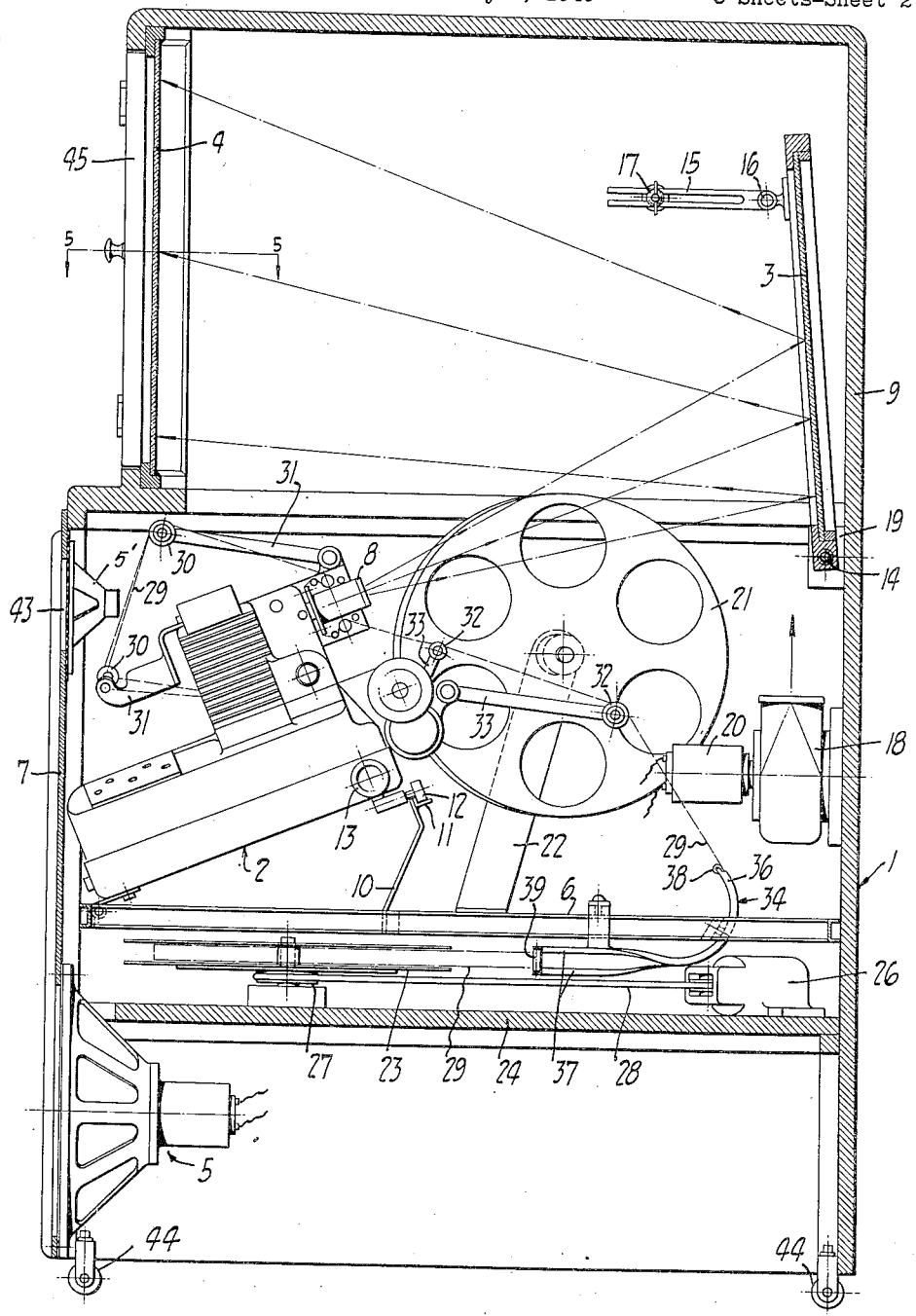
FIG_4_
INVENTORS
Julian A. Links
Jerome P. Herst
BY
ATTORNEYS Feb. 29, 1944.  J. A. LINKS ET AL  2,342,874
MOTION PICTURE PROJECTING APPARATUS
Filed May 6, 1940  3 Sheets-Sheet 3

INVENTORS
Julian A. Links
Jerome P. Herst
BY
ATTORNEYS

Patented Feb. 29, 1944

2,342,874

UNITED STATES PATENT OFFICE 2,342,874

MOTION PICTURE PROJECTING APPARATUS

Julian A. Links and Jerome P. Herst, San Francisco, Calif., assignors of one-half to Max Jay Hirsch, San Francisco, Calif.

Application May 6, 1940, Serial No. 333,528

3 Claims. (Cl. 88—24)

This invention relates to a compact arrangement of motion picture projecting apparatus in a cabinet in which the screen is carried by the cabinet and is exposed for viewing the image projected thereon from outside the cabinet.

One of the objects of the invention is the novel arrangement of the reels mounting the film carrying the image or images to be projected, whereby extremely large reels carrying a great length of film may be used without interference with the light rays projecting the image, and without enlarging the cabinet for the specific purpose of accommodating the reels.

Another object of the invention is a novel arrangement of the projector screen relative to single image-reflecting mirror disposed in the path of the light rays from the projector lens for producing a relatively large image on the screen in one wall of the cabinet enclosing the projector and mirror and which arrangement is such as to require a relatively small cabinet.

Another object is the provision of a projector, reflector and screen in a relatively small cabinet, which projector, reflector and screen are so compactly arranged relative to each other and so constructed, as to produce a larger, sharper and more brilliant image on the screen than has heretofore been possible or practical without substantial increase in the source of light for projecting said image, and without enlarging the cabinet to unreasonably large dimensions.

Another object is the novel arrangement of a projector, reflector and screen and cooling means, all in a relatively small cabinet suitable for use in an ordinary sized room, and in which cabinet provision is made for sound equipment for sound pictures, including an amplifying system without enlarging the cabinet or interfering with the other elements in the cabinet.

A still further object of the invention is improved film guide means for slidably guiding the film with the minimum of friction and without engaging the film emulsion and without engaging the area of the film through which the light of the projector is transmitted for the purpose of uniprojecting the image or for the purpose of effecting the production of sound where a sound track is carried by the film.

An additional object is an improved screen onto one side of which the light image is projected for observation of the image on the other side of said screen, and which screen is so formed as to transmit the light from the projector therethrough with the minimum of resistance consistent with a sharply defined bright image on said screen, and which screen also is constructed to eliminate the so called "hot spot" or area of abnormal brightness, and to rectify undesirable color tone resulting from the use of the conventional projector light bulb that tends to produce a yellowish cast projected onto a screen.

Other objects and advantages will appear in the specification and drawings annexed hereto.

This application is a continuation in part of copending application, Ser. No. 293,348, filed September 5, 1939, and which has become U. S. Patent No. 2,290,287, dated July 21, 1942.

Fig. 1 represents a front plan view of the cabinet enclosing the various elements of the invention.

Fig. 2 is a side view of the cabinet.

Fig. 3 is an enlarged sectional view taken along line 3—3 of Fig. 2, with certain parts broken away and in elevation for clarity.

Fig. 4 is a vertical sectional view through the cabinet, showing various internal parts in elevation.

Figure 5:
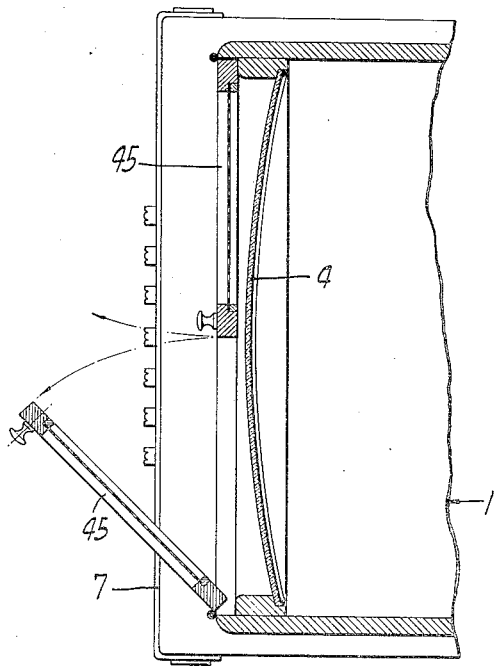
Fig. 5 is an enlarged horizontal sectional view through the screen.
Figure 6:
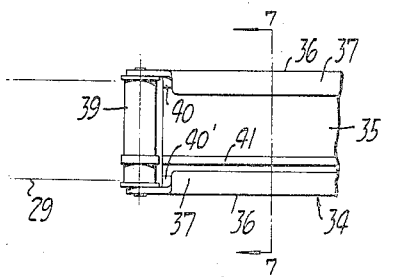
Fig. 6 is an enlarged fragmentary elevational view of one end of the film track or guide.

In detail, the various elements of our projection apparatus are contained within a vertically extending, generally rectangular cabinet 1.

In detail, cabinet 1 encloses a conventional motion picture projector 2, a mirror 3, and a screen 4. The projector shown in the drawings is one of the type equipped for use with sound film, in which a sound track is on one margin of the film.

Cabinet 1, in this showing of the invention, is vertically extending and the screen is positioned in an opening in the upper portion of the front, lateral side wall. While the invention is not intended to be restricted to any particular dimensions, nevertheless, since one of the important features of the invention is the novel arrangement of elements for producing a clear, uniformly illuminated, relatively large image in a small space, the dimensions of the cabinet, as illustrated, may be helpful. These dimensions may, of course be proportionately increased or decreased.

The cabinet as illustrated in the drawings is about five feet high, and about twenty-eight inches wide and about thirty inches deep. The screen in the upper front side is about twenty-two inches high, and about twenty-eight inches in width. Thus the cabinet is about the size of a radio cabinet. A loud speaker 5, disposed below the projector, may be combined with loud speaker 5', positioned between the projector and screen, to reduce the vertical height of the cabinet in which the height would be less than five feet and in which case the screen covers are approximately one-half of the area of the front side, and at the most desired level for viewing the picture by a seated and standing audience.

The projector 2 is supported on frame members 6 secured to the walls of the cabinet a distance spaced from the lower end of the latter. Said projector is positioned adjacent the front side 7 of the cabinet with the projector lens 8 on the side of the projector facing toward the rear wall 9 of the cabinet. The projector is supported in tilted position by a bracket 10 so that the lens is directed slantingly upwardly for directing the image projected from said projector onto the mirror 3, said mirror being positioned in generally opposed relation to screen 4, but at a slightly lower level. The mirror is also slightly inclined relative to rear wall 9, and is positioned relative to the direction of light rays striking the same, to reflect said rays onto the rear side of screen 4.

The angle at which the projector is tilted may, of course, be varied, the raised rearwardly directed side of the projector being supported on a horizontal track 11 carried by the upper end of bracket 10. A pair of horizontally spaced rollers 12 carried by the projector being rollable on said track toward and away from each other, and manipulable for so moving by a thumb screw 13 that in turn simultaneously changes the angle of links connecting between the rollers and projector for raising and lowering the rearwardly directed side of the projector.

The mirror 3 is horizontally pivoted at its lower edge at 14 to wall 9 for swinging of the mirror to change its angle, as desired, and arms 15, pivotally connected at one of their ends at 16 to the mirror may be moved longitudinally relative to arm engaging nuts 17 for tilting the mirror and for locking the mirror in adjusted position.

The projector 2 is positioned adjacent the screen 4, in this vertical cabinet, and below the screen and the light rays from the projector pass, unobstructedly to the mirror 3 for direct reflection to the screen. The lens 8 is a fairly wide-angle lens, and the diagonal dimension of the screen is about two-thirds the distance the light travels from the projector lens to the screen. The image on the screen covers the entire screen. Hertofore, the only attempts for enlarging the screen image of which we are aware require a plurality of mirrors and also require the light to travel at least double the diagonal dimension of the screen and even then a much smaller image is the result, unless the cabinet is made so large as to be impractical. The longer distance of travel of the light plus the numerous reflections of the image, obviously results in an extremely dim image on the screen unless the source of light is at least about double the wattage that applicants require. Any increase in the light wattage increases the heat and shortens the length of life of the lamp, and also augments the tendency to produce a "hot spot" in the image on the screen, or a spot of excessive brightness.

From the foregoing, the great advantage of applicants' arrangement will be appreciated, since the production of a large, brilliant image while using a lamp of relatively small wattage, in which the projector and screen are carried in a relatively small cabinet, are essential to success in a cabinet type projection apparatus.

As a contributing factor in producing a brilliant, sharp image, applicants' screen is highly important.

The screen 4 is bowed horizontally in one dimension a degree sufficient to rectify any distortion that might otherwise exist. The screen is rectangular, with its greatest linear dimension being horizontal, and the rays disposed in horizontal planes that emerge from the lens, should all travel substantially the same distance to the screen. Any vertical distortion that may occur is not noticeable, hence horizontal bowing of the screen is adequate, not only to correct distortion, but to also reduce the tendency to over-illumination at the center of the screen.

The screen may be of glass, or the various transparent materials produced from plastic compositions, and the concave side facing into the cabinet is preferably acid-etched or sand blasted. What is known as double-etching of the surface, is desirable, where the acid-resisting ground is opened to the acid by the use of rollers run at right angles over the ground in the conventional manner. The ultimate desired result by any process is to produce a dense frosting effect on the concave surface with the minimum resistance to passage of light, other than that effected by the diffusion of the light rays. Thus the etching or sand blasting process is preferable to the use of lacquer, etc., and is highly desirable over the conventional method of using tracing cloth or fabric, whether supported by rigid, or semi-rigid transparent material. Plastic sheet materials, such as are known by the trade-names, "Lucite," "Lumarith," etc., are satisfactory. In fact, these materials in most instances are preferable to glass, being for practical purposes, unbreakable.

The total elimination of the central "hot spot" or light spot in the projected image, is caused principally by the very dense etch of the screen, and may be accomplished by double-etching the central portion of the screen only, and fading the density of the centrally etched area into a less dense, single etched margin, but from an economic standpoint, the entire concave side may be double-etched or very densely etched.

It is also important to note that the screen 4 should not exceed about one-eighth inch in thickness, and where the material is a plastic, the thickness may be reduced to about one-sixteenth to three-thirty-seconds inch. The resistance to the passage of light through the screen and objectionable refraction of the rays, is thus reduced to the minimum, and the image is sharp and clear even where the wattage in the projector is as low as seven hundred fifty watts, whereas with a plurality of mirrors and with ordinary screens the wattage to produce a fairly satisfactory image, insofar as brightness is concerned, is about double the above.

The screen preferably is of a slightly bluish cast, in color, which is not appreciably noticeable in looking at the screen when no picture is being projected thereon, since the source of light is yellowish in filament lamps, and would otherwise give a yellowish, warm image. With the slight bluish cast, the image appears to be produced with a clear white light, which is ordinarily most desirable. Whatever coloring is used in the screen, should not, however, be so great as to cause a dimming of detail in the image, since the light source should be as small in wattage as is possible.

The mirror 3 has its side facing the projector silvered or treated, for reflecting the light, this side being generally termed the "first side." Thus there is no refraction of light by the mirror, and no resistance to passage of light into the sheet of glass or the like that carries the reflecting surface.

In operation of the projector, a blower 18 is positioned below the mirror and arranged to draw outside air into the cabinet and to blow the same over the mirror, the air thus blown passing over both sides of the mirror since a space 19 is between the lower edge of the mirror and the wall 9, while the upper edge of the mirror is spaced from the top of the cabinet and said wall.

This blower is to prevent fogging of the mirror during operation of the projector, and the air in the cabinet is also circulated over the projector and film as well, thus facilitating the cooling of the area within the cabinet. A motor 20 drives the blower, which motor may be in the projector circuit or independent of said circuit, as desired.

In the conventional projector, the reels for either 8 mm. film or 16 mm. film, are relatively small, but in either case, are generally disposed in a single vertical plane, one over the other, with the central horizontal axis of the upper reel disposed above the projector lens a distance nearly that of the radius of the reel. The result of the above arrangement has been to preclude the use of wide-angle lens, and has necessitated a relatively large cabinet and the use of several enlarging mirrors with the attendant objectionable use of a high wattage lamp.

In our apparatus, we have mounted the feed reel 21 along one lateral side of the projector, and about centrally of the depth of the cabinet with its central horizontal axis slightly lower than the level of the lens 8. This reel may be rotatably carried on a bracket 22 supported on one of frame members 6. The bracket and bearing carrying the reel are preferably arranged and adapted to support the reel in a plane slightly divergent to the vertical plane in which the projector lens barrel is longitudinally disposed so that the reel will in no wise interfere with the rays of light projected from the lens. Fig. 3 best shows the arrangement of the reel. The feed reel 21 in this position may be from seventeen to about twenty-four inches in diameter, giving from one to six hours' run of film. The diameter of the reel is only limited by approximately the depth of the cabinet, since the upper portion of the reel is just out of the rays of light deflected from the mirror to the screen.

The take-up reel 23 is disposed horizontally below the projector, and is rotatably supported on a supporting member 24 that is spaced below the projector. Thus the take-up reel does not in the least interfere with access to the projector, or feed reel, through side doors 25 (Figs. 2, 3) in a lateral side wall of the cabinet, and ready access to the take-up reel itself is provided for.

The take-up reel 23 is driven by motor 26 that is separate from the projector and blower motors, the motor shaft being connected to pulley 27 on the take-up reel shaft. The connection between the pulley on the motor 26 and pulley 27 is a coiled spring wire belt 28, that is adapted to slip sufficiently to compensate for the difference in diameter of the roll of film on the take-up reel during winding of the film on the take-up reel, the motor 26 being adapted to drive the take-up reel at the commencement of winding of the film thereon at the right speed for moving the film past the projector lens the correct number of frames per second, but the speed of which motor may be controlled in the conventional manner for driving the take-up reel at various speeds according to the character of the film and the effect desired. It is important to note that the take-up reel is not driven by the projector motor, but independently of the latter and the yieldable drive connection insures against injury to the film as well as insuring a correct winding of the film irrespective of the size of the take-up reel or feed reel. The projector motor, of course, positively moves the film past the projector lens at a uniform desired rate of speed.

The film 29 extends from the feed reel 21 over pulleys 30 carried on brackets 31 supported on the projector, to the projector lens 8 for passage past the latter and past the positive drive members at the lens. From the lens 8 the film is carried over pulleys 32 on brackets 33 to a guide track 34 and over the latter to the take-up reel 23.

This guide track is generally similar in shape to the guide track illustrated in our co-pending application, and is best illustrated in Figs. 3, 4, 6 and 7, the latter two figures showing enlarged details of the same.

Figure 7:
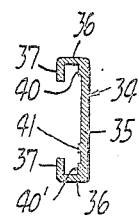
Fig. 7 is a sectional view taken along line 7—7 of Fig. 6.

The track 34 is an elongated strip of metal or any other suitable rigid material, which strip is generally of channel shape, having a base 35, opposed sides 36, and flanges 37 at the outer edges of said sides, which flanges extend toward each other a short distance (Fig. 7). This strip 34 is given a half turn with one end directed generally toward the last pulley 32 over which the film passes after leaving the projection lens. Said one end carries a roller 38 over which the film passes to a position between the sides 36 and between the flanges 37 and base 35 of the guide strip. The opposite end of the guide strip is generally directed toward the take-up reel 23, and carries a roller 39 similar to roller 38. The base 35 of the guide strip is longitudinally recessed forming raised marginal portions 40, 40' along sides 36. Adjacent the portion 40' but slightly spaced therefrom and extending longitudinally of the strip is a ridge 41 of the same height as the marginal portions 40.

The film 29 is fed into the one end of the guide strip, over roller 38 with the emulsion side facing the open side of the channel. Where a sound track is on the film, such track lies between portion 40' and ridge 41, while the clear margins of the film slide on the portions 40, 40'. Thus the film is slidably supported and guided from the projector to the horizontal take-up reel and is positively held against accidental displacement by the guide strip. There is practically no resistance to the slidable movement over the guide strip, and no injury whatsoever results from such sliding movement, since the only contact between the film and guide strip is at those portions of the film where no image or sound producing functions exist when the film moved past the projector. This guide track is highly important in that it solves in a simple and positive manner the changing of the direction of the film between the reels and the projector lens. While this guide strip is shown between the projector and take-up reel, it is believed to be novel in motion picture projecting apparatus wherever used to support and guide the film, although in a cabinet and in the position and form substantially as shown, it makes practical the use of a horizontal take-up reel.

The wiring of the motion picture projector loud speakers and amplifying system, and motors is not shown since this wiring is conventional. Remote controls are provided on the outer face of the cabinet, as indicated at 42 (Fig. 1) for controlling the sound, speed and operation of the various elements in the cabinet. Also an opening 43 is provided before the speakers in the forward side 7 of the cabinet, which vent may be suitably screened, as indicated. Casters 44 may also be provided, for rolling the cabinet over the floor, and doors 45 are provided for closing the screen 4 if desired.

The general arrangement of the vertical feed reel, and the horizontal take-up reel is shown in our co-pending application referred to earlier in the description. Also a guide strip somewhat similar to the one herein shown is in our co-pending application, except that said strip in the co-pending application is not provided with a ridge for the use of sound film. The instant arrangement of a vertical cabinet, instead of the horizontal cabinet, as shown in the co-pending case, provides for an appreciably larger screen, and the arrangement of the projector as herein shown with respect to the position of the screen 4 and mirror 3, is somewhat different than was shown in our previous application, although in both instances the projector is angularly disposed relative to the walls of the cabinet for directing the image toward one corner adjacent which the mirror is positioned.

The passage of the film 29 past the lens and sound portion of the projector is conventional, hence is not shown in detail.

While what is known as a continuous re-wind reel (not shown) may be disposed alongside the projector, in such case the advantages of the positioning of the mirror, projector, and screen 4, will still be present, and except where the feed reel and take-up reel are specifically claimed, it is not intended that the invention is to be restricted to the use of two reels.

Having described our invention, we claim:

1. In a motion picture projection unit comprising a cabinet enclosing a motion picture projector that includes a projection lens, a source of light positioned for projection of the rays therefrom by said lens, a film, and means for supporting said film in a position between said lens and source of light for projection of an image carried on said film by said lens; one of the walls of said cabinet being formed with an opening, a screen in said opening, and a mirror positioned within said cabinet to reflect the image projected from the projector lens onto the side of said screen that faces into said cabinet, said screen being rectangular and of relatively thin, transparent material of substantially uniform thickness bowed horizontally, the concave side of said screen facing into said cabinet and said concave side being densely etched to provide a frosted surface adapted to substantially uniformly diffuse the light reflected thereto from said mirror, the curvature of said screen being such that the rays of light striking the concave surface thereof are substantially equal in length whereby the light intensity over said concave surface is substantially uniform.

2. In a construction as defined in claim 1, said screen being not greater than about one-eighth of an inch in thickness, and having a resistance to passage of light substantially that of clear glass, thereby substantially eliminating distortion of the image projected thereon due to refraction of rays by the material and producing in coaction with the mirror and projector a bright, sharply defined image.

3. A motion picture projection unit comprising; a motion picture projector having a wide-angle projection lens; a horizontally bowed, vertically disposed, substantially rectangular screen of light transmitting material; a single reflector positioned to receive directly from said lens the image producing rays projected therefrom and to reflect said rays directly onto the concave side of said screen; a cabinet enclosing said projector and said reflector; one of the walls of said cabinet being formed with an opening, and said screen being fitted in said opening with its concave side facing into said cabinet toward said reflector; the said reflector, screen and lens being positioned in a single plane bisecting all three; the horizontal curvature of said screen substantially corresponding to the curvature of a portion of a circle having said lens as a center whereby the image projected on said screen will be substantially free from horizontal distortion and whereby the intensity of said rays at said screen in any horizontal plane will be substantially equal; the convex side of said screen being exposed for viewing of the image projected thereon; the horizontal dimensions of said cabinet being substantially equal to the horizontal width of said screen; said lens and said projector being arranged respectively to project and to reflect the image producing rays from said projector in direction generally horizontally within said cabinet.

JULIAN A. LINKS.
JEROME P. HERST.